(12) United States Patent
Mynam et al.

(10) Patent No.: US 7,545,810 B2
(45) Date of Patent: Jun. 9, 2009

(54) APPROACHES FOR SWITCHING TRANSPORT PROTOCOL CONNECTION KEYS

(75) Inventors: Satish K. Mynam, San Jose, CA (US); Anantha Ramaiah, Sunnyvale, CA (US); Chandrashekhar Appanna, Cupertino, CA (US); Keyur Patel, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 648 days.

(21) Appl. No.: 11/173,690

(22) Filed: Jul. 1, 2005

(65) Prior Publication Data
US 2007/0005973 A1    Jan. 4, 2007

(51) Int. Cl.
*H04L 12/56* (2006.01)
*H04L 9/14* (2006.01)

(52) U.S. Cl. .................. 370/392; 713/171; 713/181
(58) Field of Classification Search .............. 726/4; 713/171, 180, 169, 176, 181
See application file for complete search history.

(56) References Cited

U.S. PATENT DOCUMENTS

| | | | |
|---|---|---|---|
| 6,061,799 A | 5/2000 | Eldridge et al. | |
| 6,295,361 B1 * | 9/2001 | Kadansky et al. | 380/278 |
| 6,502,192 B1 | 12/2002 | Nguyen | |
| 7,100,054 B2 | 8/2006 | Wenisch et al. | |
| 7,194,761 B1 | 3/2007 | Champagne | |
| 7,231,458 B2 * | 6/2007 | Tenereillo et al. | 709/241 |
| 7,346,682 B2 | 3/2008 | Basani et al. | |
| 2004/0034773 A1 | 2/2004 | Balabine et al. | |
| 2004/0223497 A1 * | 11/2004 | Sanderson et al. | 370/395.52 |
| 2005/0027985 A1 | 2/2005 | Sprunk et al. | |
| 2005/0132214 A1 | 6/2005 | Naftali | |
| 2005/0160478 A1 | 7/2005 | Ramaiah et al. | |
| 2006/0101271 A1 * | 5/2006 | Thomas | 713/180 |
| 2007/0005973 A1 | 1/2007 | Mynam et al. | |
| 2007/0005985 A1 | 1/2007 | Eldar et al. | |
| 2007/0101129 A1 | 5/2007 | Wong et al. | |

OTHER PUBLICATIONS

R. Bonica, et al., "Authentication for TCP-based Routing and Management Protocols", draft-bonica-tcp-auth-00, Juniper Networks, TCPM Working Group Internet—Draft, Sep. 16, 2005.

(Continued)

*Primary Examiner*—Kwang B Yao
*Assistant Examiner*—Alex Skripnikov
(74) *Attorney, Agent, or Firm*—Hickman Palermo Truong & Becker LLP

(57) ABSTRACT

Approaches are disclosed for switching transport protocol connection keys. In a transport protocol module configured to use a first key for signing messages associated with a transport protocol connection, a second key is configured for the transport protocol connection. A first message that is associated with the transport protocol connection is received. The first message includes a first signature. A first and a second message digests are computed for the first message, where the first message digest is based on the first key and the second message digest is based on the second key. The first message is validated if the first signature in the first message matches any one of the first message digest and the second message digest.

46 Claims, 6 Drawing Sheets

OTHER PUBLICATIONS

R. Bonica, et al., "Authentication for TCP-based Routing and Management Protocols" draft-bonica-tcp-auth-01, Juniper Networks, TCPM Working Group Internet—Draft, Sep. 27, 2005.

R. Bonica, et al., "Authentication for TCP-based Routing and Management Protocols", draft-bonica-tcp-auth-02, Juniper Networks, TCPM Working Group Internet—Draft, Oct. 5, 2005.

A. Ramaiah, et al., "Key Rollover Schemes for TCP Connections Employing a Shared Key Model", Network Working Group Internet—Draft, Nov. 23, 2005.

John Nagle, "Congestion Control in IP/TCP Internetworks", Network Working Group Request for Comments: 896, Jan. 6, 1984.

R. Rivest, "The MD5 Message-Digest Algorithm", Network Working Group Request for Comments: 1321, Apr. 1992.

Y. Rekhter, "A Border Gateway Protocol 4 (BGP-4)", Network Working Group Request for Comments: 1771, Mar. 1995.

F. Baker, et al., "RIP-2 MD5 Authentication", Network Working Group Request for Comments: 2082, Jan. 1997.

A. Heffernan, "Protection of BGP Sessions via the TCP MD5 Signature Option", Network Working Group Request for Comments: 2385, Aug. 1998.

F. Baker, et al., "RSVP Cryptographic Authentication", Network Working Group Request for Comments: 2747, Jan. 2000.

L. Andersson, et al., "LDP Specification", Network Working Group Request for Comments: 3036, Jan. 2001.

International Searching Authority, "Notification of Transmittal of the International Search Report and the Written Opinion of the International Searching Authority, or the Declaration", International application No. PCT/US06/40959, received Oct. 18, 2007, 11 pages.

Claims, International application No. PCT/US06/40959, 4 pages.

* cited by examiner

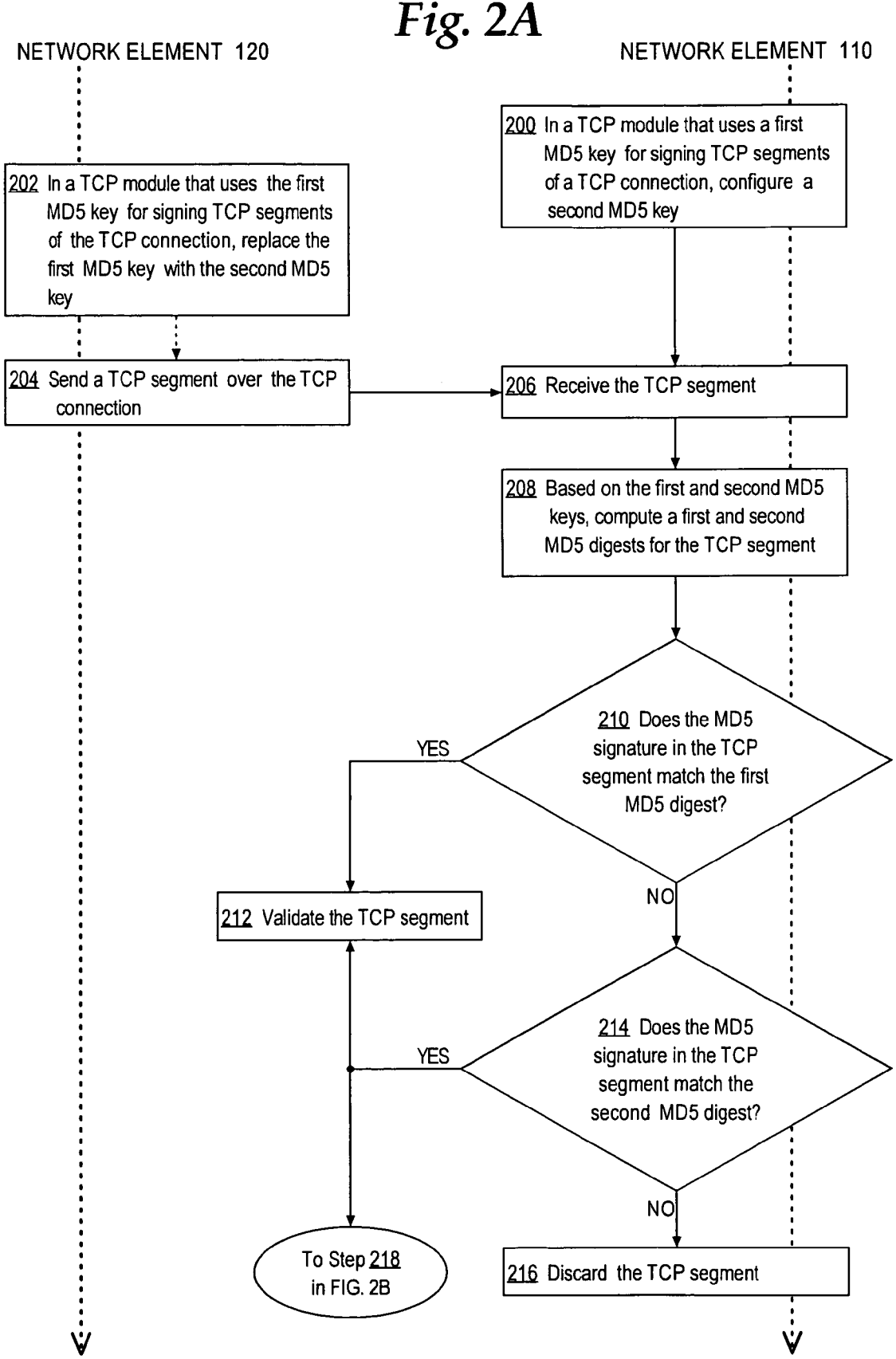

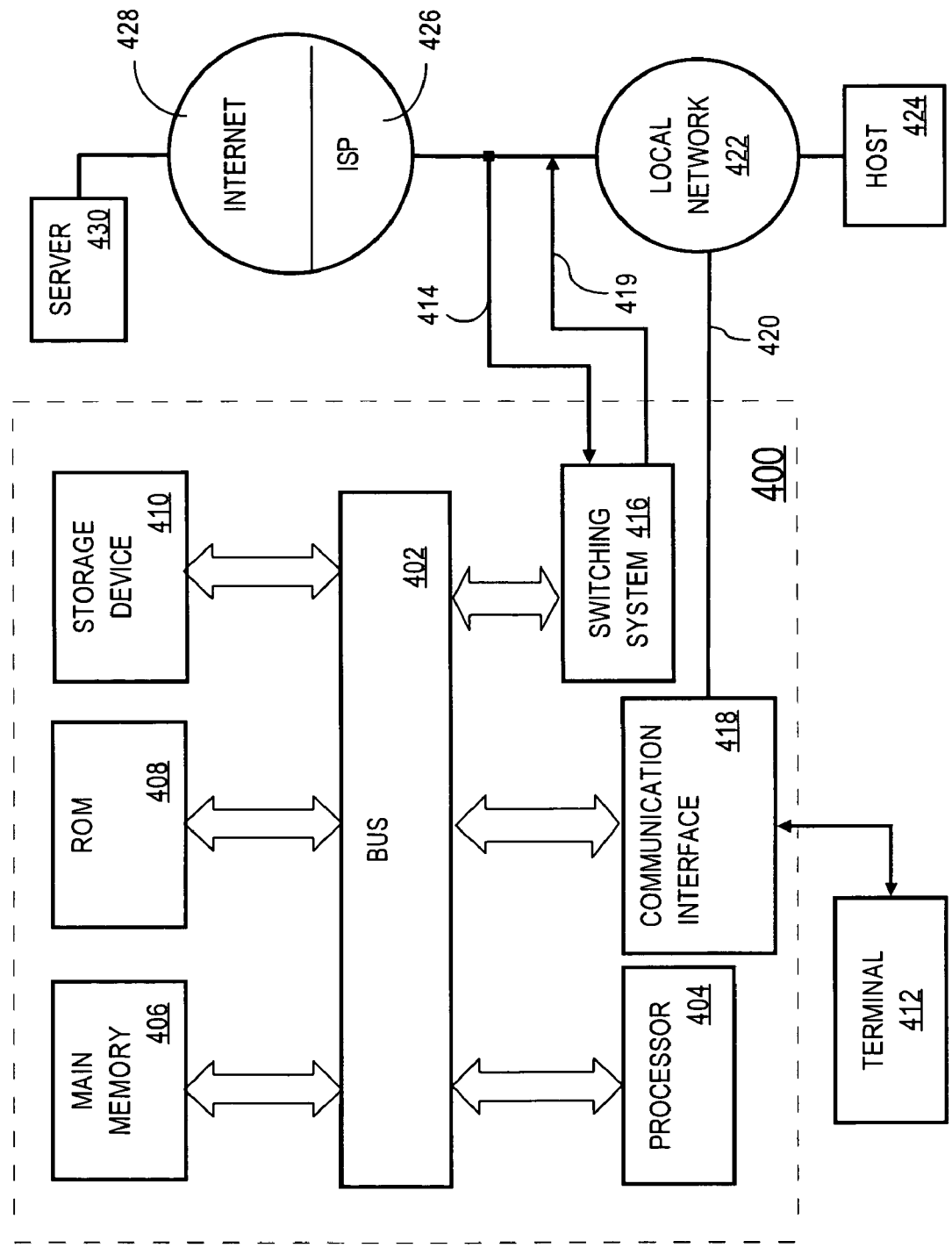

APPROACHES FOR SWITCHING TRANSPORT PROTOCOL CONNECTION KEYS

FIELD OF THE INVENTION

The present invention generally relates to authenticating message communications. The invention relates more specifically to methods for changing the keys that are used to digitally sign transport protocol connections.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Transmission Control Protocol (TCP) is a transport layer protocol that provides a reliable connection-oriented data delivery service to upper-layer applications through the use of sequenced acknowledgment with retransmission of segments when necessary. In a typical TCP implementation, a TCP connection is established between two TCP endpoints that are established on two hosts. A TCP endpoint is maintained by the TCP module (or stack) of a host and is represented as the combination of an Internet Protocol (IP) address of the host and a TCP port number.

TCP uses a stream data transfer mechanism to deliver an unstructured stream of bytes between TCP endpoints. The bytes in the stream are numbered sequentially and are grouped into TCP segments for transmission over the TCP connection between the TCP endpoints. A TCP segment transmitted over a TCP connection includes a header portion and a payload portion, and can be identified by the sequence number of the first byte in the payload portion of the segment. The transport service provided by TCP is used by upper-layer applications to exchange application-specific data over the TCP connection.

One example of an upper-layer application that uses TCP to exchange data is Border Gateway Protocol (BGP). BGP is a peer-to-peer routing protocol the latest version of which, BGP-4, is defined in RFC1771 that was published by the Internet Engineering Task Force (IETF) in March 1995. In order to exchange routing information, two BGP hosts, or peers, first establish a TCP connection, and then negotiate a BGP session in order to exchange network routes. Another example of an upper-layer application that uses TCP to exchange data is Label Distribution Protocol (LDP). LDP is a protocol defined for the MultiProtocol Label Switching (MPLS) architecture and is described in RFC3036 published by IETF in January 2001. In a MPLS network, two Label Switching Routers (LSRs), or LDP peers, establish a bi-directional LDP session over a TCP connection in order to exchange label-mapping information that maps network layer routing information directly to data-link layer switched paths.

TCP, however, is vulnerable to data injection attacks. In a data injection attack, an attacker guesses parameter values for a valid TCP connection and uses these parameter values to send spurious TCP segments that contain malicious or spurious data payloads. These spurious TCP segments may affect the state of the TCP connection itself or may be intended for an upper-layer application. If the receiving TCP endpoint passes such segments to the upper-layer application various problems may occur when the application acts on or executes the data payloads. The consequences of data injection attacks can be severe. For example, when a BGP session is disrupted by a change in the state of the associated TCP connection, the BGP peers that established the session may have to discard all BGP routes that were exchanged during the session and may have to re-synchronize their routing information with peer routers in the network.

One type of a data injection attack is a TCP SYN attack. In a TCP SYN attack, an attacker bombards a host with TCP SYN segments, which request the establishment of TCP connections. The TCP module on the host tries to respond to all TCP SYN segments, and soon runs out of resources. Another type of a data injection attack is a TCP RST attack. In a TCP RST attack, an attacker uses the parameters of a valid TCP connection to construct and send spurious TCP segments that request closing and re-setting of the TCP connection by setting the RST (reset) bit in the TCP segment's headers.

One prior approach for preventing such data injection attacks minimizes the chances that an attacker would be able to determine the parameters of a valid TCP connection. In this prior approach, a TCP endpoint computes a digital signature or message digest for each TCP segment that it sends, and includes the signature in the TCP segment header. The signature is computed based on a key or a password known only to both TCP endpoints, and uses the contents of one or more fields of the TCP segment as input. Thus, in order to successfully launch a data injection attack, an attacker would not only have to determine the valid TCP connection parameters, but would also have to guess the key or password used to produce the TCP segment signature.

One particular implementation of this prior approach, which implementation is used for protecting BGP sessions, is described in RFC2385 published by IETF in August 1998. In this implementation, a TCP OPTION has been defined for carrying a Message-Digest5 (MD5) hash value in a TCP segment. The MD5 algorithm (as defined in RFC1321 published by IETF in April 1992) takes as input a message of arbitrary length and produces as output a 128-bit signature, or "message digest", of the input. In this implementation, every TCP segment sent on a TCP connection contains, in the OPTIONS field of the TCP segment header, a 16-byte MD5 signature produced by applying the MD5 algorithm to the following items in order:

1. The TCP segment pseudo-header (in the order: source IP address, destination IP address, zero-padded protocol number, and segment length);

2. The TCP segment header (excluding the OPTIONS field, and assuming a checksum of zero);

3. The TCP segment data (if any); and

4. An independently-specified key or password known to both TCP endpoints and presumably specific to the TCP connection.

Upon receiving a TCP segment signed with a MD5 signature, the receiving TCP endpoint computes its own digest for the TCP segment from same data and by using its own key. The receiving TCP endpoint then compares the computed digest with the MD5 signature included in the OPTIONS field of the TCP segment. If the computed digest matches the MD5 signature included in the TCP segment, the receiving TCP endpoint validates the TCP segment and passes the payload portion of segment to the recipient upper-layer application. If the comparison fails, the TCP endpoint silently discards the TCP segment and sends back no acknowledgement.

The above approach, however, has numerous disadvantages. One disadvantage of the above approach is that, although difficult, it may not be impossible for an attacker to produce a valid signature for a malicious TCP segment that it wants to inject in the TCP connection. For example, since the MD5 algorithm is prone to a successful cryptanalytic attack, it is not impossible for an attacker to sniff a large number of similar TCP segments and to deduce the key used to create the MD5 signatures for TCP segments. This disadvantage causes serious security concerns, especially for upper-layer applications, such as BGP, that use TCP connections to run sessions for very long periods of time.

Another disadvantage of the above approach is that in some situations it is very difficult to change the TCP connection keys without significant disruption to upper-layer applications. Since both TCP endpoints must use the same key to produce signatures for the TCP segments associated with a TCP connection, when the key associated with a TCP connection needs to be changed, both TCP endpoints must change the key nearly simultaneously in order to prevent loss of data transmitted between the upper-layer applications over the TCP connection.

For example, in a BGP implementation that is in accord with RFC2385, when BGP peers establish a BGP session with each other over a TCP connection, both BGP peers may configure their respective TCP endpoints to use a shared MD5 key or password. The shared MD5 key may be provisioned to the BGP peers beforehand. Some situations may arise, however, which require that the MD5 key must be changed. For example, a MD5 key may need to be changed because of security concerns related to personnel changes (e.g. a network administrator leaving the company). In another example, if the BGP session is a long running session and is established between a BGP peer in an Internet Service Provider (ISP) network and a BGP peer in a customer network, it may be desirable to change the MD5 key periodically in order to prevent a potential attacker from guessing the key by sniffing and analyzing a large number of TCP segments sent over the TCP connection associated with the BGP session.

However, once the BGP session is established there is no practical way to change the MD5 key because BGP uses its own KEEPALIVE mechanism to detect whether the BGP session is active. BGP peers disable the TCP HoldTimer for the TCP connection, and use their own BGP KEEPALIVE HoldTimer, the value of which is negotiated during the establishing of the BGP session. A BGP peer would periodically send BGP KEEPALIVE messages to ensure that the HoldTimer on its BGP peer does not expire. For example, if the BGP peers negotiate the default BGP HoldTimer interval of 180 seconds, absent the exchange of any other BGP messages a BGP peer would send a BGP KEEPALIVE message every 60 seconds or so. If the BGP peer does not receive a communication over the BGP session within the BGP KEEPALIVE HoldTimer interval, it sends out a HoldTimer Expired Error and closes the BGP session.

Thus, if the MD5 key, which is used by a BGP peer in BGP session established over a TCP connection, needs to be changed, the key must be changed on both TCP endpoints within an interval of time that is smaller than the BGP HoldTimer. The interval of time during which the keys are changed on both TCP endpoints must be smaller than the BGP HoldTimer in order to prevent the TCP endpoint from silently discarding TCP segments signed with the old key that carry BGP messages of the BGP session. However, in a large network such as an ISP, it is practically impossible to change the MD5 keys on all TCP endpoints that support BGP peers within a interval of time as small as a BGP HoldTimer interval.

Based on the foregoing, there is a clear need for techniques that overcome the disadvantages of the prior approach described above for preventing data injection attacks.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a flow diagram that illustrates an overview of a method for switching TCP MD5 keys according to an example embodiment of a first approach;

FIG. 4 is a block diagram that illustrates a computer system upon which an embodiment may be implemented.

DETAILED DESCRIPTION

Figure 1:
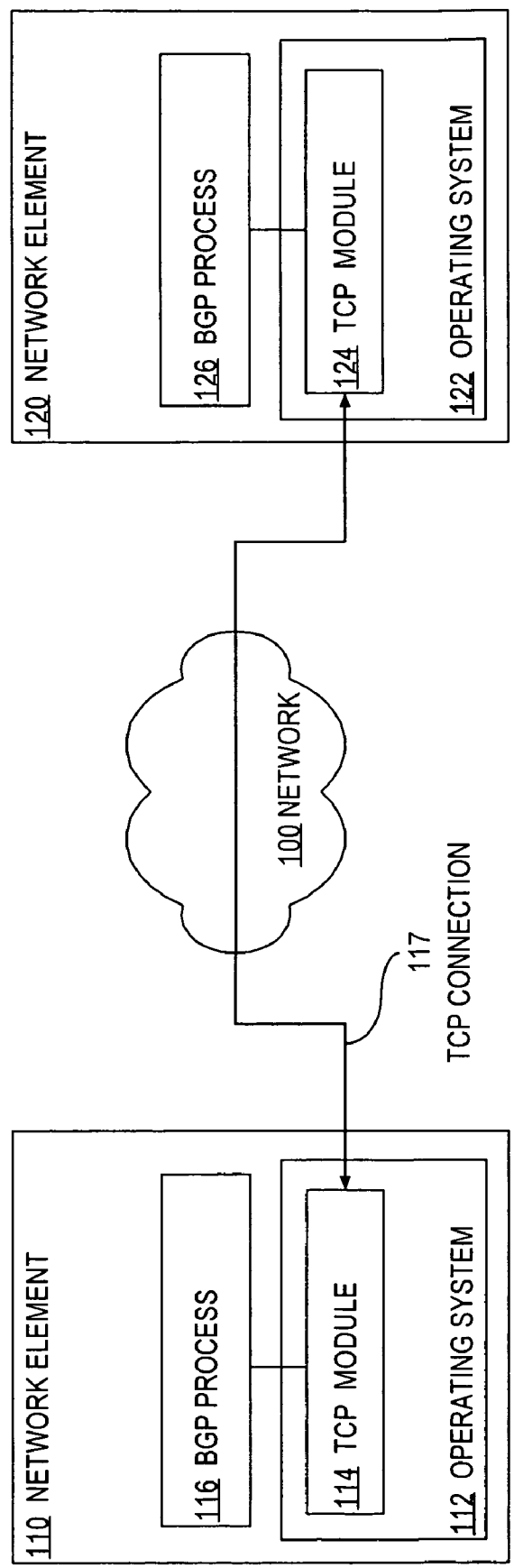
FIG. 1 is a block diagram that illustrates an operational context in which embodiments may be implemented.

Approaches for switching transport protocol connection keys are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Structural and Functional Overview
   3.0 First Approach for Switching Transport Protocol Connection Keys
      3.1 An Example Embodiment of a Method for Switching MD5 Keys by BGP Sessions Running Over TCP Connections
      3.2 Transport Protocol Connection Key Switchover and Application Session Key-Chaining
      3.3 Alternative Embodiments and Operational Contexts
   4.0 Second Approach for Switching Transport Protocol Connection Keys
      4.1 An Example Embodiment of a Method for Switching MD5 Keys by BGP Sessions Running Over TCP Connections
      4.2 Alternative Embodiments
      4.3 Application Session Key-Chaining
   5.0 Implementation Mechanisms—Hardware Overview
   6.0 Extensions and Alternatives 1.0 General Overview The needs identified in the foregoing Background, and other needs and objects that will become apparent for the following description, are achieved in the present invention, which comprises, in one aspect, a method for switching transport protocol keys. In a transport protocol module configured to use a first key for signing messages associated with a transport protocol connection, a second key is configured for the transport protocol connection. A first message that is associated with the transport protocol connection is received. The first message includes a first signature. A first and a second message digests are computed for the first message, where the first message digest is based on the first key and the second message digest is based on the second key. The first message is validated if the first signature in the first message matches any one of the first message digest and the second message digest.

In a feature of this aspect, when the first signature included in the first message matches the second message digest, the transport protocol module is re-configured to use the second key for signing messages associated with the transport connection. A second message that includes a second signature that is computed based on the second key is sent over the transport connection.

In one feature of the aspect, the transport protocol module is executed by a network element that is established in a packet-switched network.

In a feature of this aspect, the transport protocol module is a Transmission Control Protocol (TCP) module, the transport protocol connection is a TCP connection, the first key is a first Message-Digest5 (MD5) key, the second key is a second MD5 key, the first message is a first TCP segment, the first signature is a first MD5 signature included in a MD5 OPTION in the header of the first TCP segment, the first message digest is a first MD5 digest, and the second message digest is a second MD5 digest.

In one feature of the aspect, a Border Gateway Protocol (BGP) process has established a BGP session with a BGP peer over the TCP connection. When the first MD5 signature included in the first TCP segment matches the second MD5 digest, the TCP module is reconfigured to use the second MD5 key for signing TCP segments associated with the TCP connection. The BGP process is notified that the second MD5 key is used for signing TCP segments.

In a feature of this aspect, the BGP process performs the step of configuring the TCP module with the second MD5 key for the TCP connection. The BGP peer configures a TCP peer module of a network element that executes the BGP peer to use the second MD5 key for signing TCP segments that are sent to the BGP process over the TCP connection.

In one feature of the aspect, the BGP process selects the second MD5 key from a list of MD5 keys and the BGP peer also selects second MD5 key from same list of MD5 keys, where the list of MD5 keys is pre-provisioned to both the BGP process and the BGP peer.

In a feature of this aspect, based on one or more criteria associated with the BGP process and the BGP peer, the BGP process performs the step of configuring the TCP module with the second MD5 key for the TCP connection before the BGP peer configures the TCP peer module to use the second MD5 key for signing TCP segments sent to the BGP process over the TCP connection. The one or more criteria may be any parameter or parameters associated with the BGP process and the BGP peer including, but not limited to, the BGP router IDs and the Internet Protocol (IP) addresses of the BGP process and the BGP peer.

In one feature of the aspect, the BGP process is executing on a network element established in an Internet Service Provider (ISP) network, and the BGP peer is executing on a network element established in a customer network of the ISP network. In another feature, the BGP peer is executing on a network element established in an Internet Service Provider (ISP) network, and the BGP process is executing on a network element established in a customer network of the ISP network. In yet another feature, the BGP peer and the BGP process are executing on network elements established in the same network.

A different aspect of the invention comprises a method of switching MD5 keys used in the TCP connections. In a TCP module that is configured to use a first MD5 key for signing TCP segments associated with a TCP connection, a second MD5 key for signing TCP segments associated with the TCP connection is configured. A first TCP segment associated with the TCP connection is received. The first TCP segment includes a first message that is sent to an application that utilizes the TCP connection and a first MD5 signature of the first message. A second TCP segment associated with the TCP connection is received. The second TCP segment includes the first message sent to the application, a second MD5 signature of the first message, and the same sequence number as the first TCP segment. A first MD5 digest for the first TCP segment is computed based on the first MD5 key. A second MD5 digest for the second TCP segment is computed based on the second MD5 key. If the first MD5 digest matches the first MD5 signature included in the first TCP segment and the second MD5 digest matches the second MD5 signature included in the second TCP segment, then the TCP connection is reconfigured to use only the second MD5 key for signing TCP segments associated with the TCP connection.

In a feature of this aspect, re-configuring the TCP connection to use only the second MD5 key for signing TCP segments associated with the TCP connection further comprises ceasing to send over the TCP connection any TCP segments that are signed using the first MD5 key.

In one feature of the aspect, the following steps are performed before re-configuring the TCP connection to use only the second MD5 key for signing TCP segments associated with the TCP connection: sending a third TCP segment associated with the TCP connection, where the third TCP segment includes a second message received from the application and a third MD5 signature that is computed based on the first MD5 key; and sending a fourth TCP segment associated with the TCP connection, wherein the fourth TCP segment includes the second message received from the application and a fourth MD5 signature that is computed based on the second MD5 key, and wherein the fourth TCP segment has the same sequence number as the third TCP segment. After re-configuring the TCP connection to use only the second MD5 key for signing TCP segments associated with the TCP connections, a fifth TCP segment associated with the TCP connection is sent, where the fifth TCP segment includes a fifth MD5 signature that is computed based on the second MD5 key. In this feature, the third TCP segment and the fourth TCP segment may be kept track of in a retransmission queue associated with the TCP connection.

In a feature of this aspect, the application is a BGP process, and the first message is a BGP KEEPALIVE message sent to the BGP process from a BGP peer over a BGP session that is established between the BGP process and the BGP peer over the BGP connection. In this feature, the BGP process configures the TCP module with the second MD5 key for the TCP connection, and the BGP peer configures a TCP peer module of a network element that executes the BGP peer to use the second MD5 key for signing TCP segments that are sent to the BGP process over the TCP connection.

In one feature of the aspect, the BGP process selects the second MD5 key from a list of MD5 keys, and the BGP peer also selects the second MD5 key from the same list of MD5 keys, where the list of MD5 keys has been provisioned to both the BGP process and the BGP peer. Both the BGP process and the BGP peer select the second MD5 key from the list of MD5 keys after a predetermined interval of time has expired, where the predetermined interval of time has been provisioned to both the BGP process and the BGP peer. The list of MD5 keys may be an ordered list of a plurality of MD5 keys, where the first MD5 key and the second MD5 key are among the plurality of MD5 keys.

In a feature of this aspect, the application is a Label Distribution Protocol (LDP) process.

In other aspects, the invention encompasses a computer apparatus and a computer-readable medium configured to carry out the foregoing steps.

2.0 Structural and Functional Overview

According to a first approach for switching transport protocol keys described herein, one of the transport protocol endpoints associated with a transport connection may selectively be placed in a "passive" mode, and the other transport protocol endpoint associated with the transport connection is placed in an "active" mode. In the "passive" mode, a transport protocol module that manages the "passive" endpoint may use multiple keys to compute message digests for transport protocol messages received over the transport connection from the "active" endpoint. However, the transport protocol module may use only the currently configured key for signing outbound transport protocol messages that are sent over the transport connection to the "active" endpoint. The "passive" mode may be specified for endpoints associated with one, some, or all transport connections managed by the transport protocol module on a per-connection basis.

In the "active" mode, a transport protocol module that manages the "active" transport protocol endpoint associated with a transport connection does not use multiple keys to compute message digests for transport protocol messages received over the transport connection. Instead, the transport protocol module uses the same key for signing outbound transport protocol messages and for computing message digests for inbound transport protocol messages. The "active" mode may be specified for transport protocol endpoints associated with one, some, or all transport connections managed by the transport protocol module on a per-connection basis.

In operation, according to this approach a new key is configured for a "passive" transport protocol endpoint at the transport protocol module that manages the endpoint. The transport protocol module then starts using both the new key and the old (or currently configured) key to compute message digests for transport protocol messages that are received over the transport connection from the "active" endpoint. The new key is a commonly agreed upon key between the two peers on which the "passive" and "active" endpoints are established. When the same new key is configured for the "active" endpoint of the transport connection, the transport protocol module that manages the "active" endpoint discards the old key and begins signing with the new key all transport protocol messages send over the transport connection to the "passive" endpoint. When the transport protocol module managing the "passive" endpoint receives over the transport connection one or more transport protocol messages signed with the new key, it switches to using the new key for signing outbound transport protocol messages sent over the transport connection to the "active" endpoint. For example, in some embodiments the transport protocol module managing the "passive" endpoint may first use the old key to compute a MD5 digest for an incoming TCP segment, and when the computed MD5 digest fails to match the MD5 signature in the TCP segment, the "passive" endpoint re-computes the MD5 digest using the new key. At this point, the switchover to the new key has been completed because both endpoints associated with the transport connection are now configured to use the new key both for signing outbound transport protocol messages and for computing message digests for inbound transport protocol messages.

According to a second approach for switching transport protocol keys described herein, the receipt of an original transport protocol message that is signed with a first key and the receipt of a duplicate of the original transport protocol message that is signed with a second key, is used to signal to a transport protocol module that it may switchover to using only the second key signing transport protocol messages sent over the transport connection.

According this approach, a transport protocol module that manages one of the endpoints of a transport connection is configured to use a new, second key in addition to an old, first key, for signing transport protocol messages sent over the transport connection and for computing message digests of transport protocol messages received over the transport connection. Similarly, the transport protocol module that manages the other endpoint of the transport connection is also configured to use the same new key, in addition to the old key, for signing transport protocol messages sent over the transport connection and for computing message digests of transport protocol messages received over the transport connection.

In operation, according to this approach a sender transport protocol module is configured to use a new key, in addition to the currently configured old key, for signing transport protocol messages sent over a transport connection. The sender transport protocol module signs a transport protocol message with the old key and sends the message over the transport connection. The sender transport protocol module then creates a duplicate of the transport protocol message and signs the duplicate message with the new key. The duplicate message is also sent over the transport connection. In some embodiments, a specific kind of messages, for example messages of type KEEPALIVE, are the only messages being sent as duplicate messages and being signed with both the old key and the new key.

The receiver transport protocol module is also configured to use the same new key, in addition to the currently configured old key, for signing transport protocol messages sent over the transport connection. The receiver transport protocol module may be configured with the new key for the transport connection before, at the same time as, or after the sender transport protocol module is configured to use the new key. The receiver transport protocol module receives both the original and the duplicate transport protocol messages, validates the original transport protocol message with its own old key, and validates the duplicate transport protocol message with its own new key. Upon determining that it has received the same transport protocol message signed with both the old key and the new key, the receiver transport protocol module begins using only the new key for signing transport protocol messages sent over the transport connection and discards the old key.

FIG. 1 is a block diagram that illustrates an operational context in which embodiments of the approaches for switching transport protocol keys described herein may be implemented.

Network element 110 and network element 120 are communicatively connected over network 100. In FIG. 1, network elements 110 and 120 are routers each of which executes one or more BGP processes 116, 126. The approaches described herein, however, are not limited to being implemented on routers executing BGP processes, and for this reason the network elements and the processes that execute on them depicted in FIG. 1 are to be regarded in an illustrative rather than a restrictive sense.

Network element 110 includes operating system 112 that includes a TCP module 114. BGP process 116 runs logically on top of operating system 112 and utilizes the transport services provided by TCP module 114. Similarly, network element 120 includes operating system 122 that includes a TCP module 124. BGP process 126 runs on top of operating system 122 and utilizes the transport services provided by TCP module 124.

BGP process 116 on network element 110 and BGP process 126 on network element 120 have established a BGP session between them over TCP connection 117. TCP connection 117 is associated with two TCP endpoints managed respectively by TCP module 114 on network element 110 and by TCP module 116 on network element 120.

In operation, upon the establishment of the BGP session, BGP process 116 configures TCP module 114 with a MD5 key, which is used by TCP module 114 to create MD5 signatures for, or to "sign", TCP segments that carry BGP messages to BGP process 126 over TCP connection 117. Similarly, BGP process 126 configures TCP module 124 with the same MD5 key, which is used by TCP module 124 to create MD5 signatures for TCP segments that carry BGP messages to BGP process 116 over TCP connection 117.

After the BGP session is established, when BGP process 116 decides to send a BGP message to BGP process 126, BGP process 116 communicates the BGP message to TCP module 114. TCP module 114 receives the contents of the message and, if necessary, breaks up the message for inclusion in the payload portion of one or more TCP segments. TCP module 114 then creates the one or more TCP segments, and, for each TCP segment, computes a MD5 signature by using the MD5 key previously provided by BGP process 116. The one or more TCP segments are transmitted to TCP module 124 over TCP connection 117, and placed in a re-transmission queue for the connection at TCP module 114 in case retransmission of the TCP segments is needed. Upon receipt of the one or more TCP segments, TCP module 124 computes a MD5 digest for each segment by using its own version of the MD5 key for TCP connection 117. For each TCP segment, if the computed MD5 digest matches the MD5 signature included in the TCP segment, TCP module 124 validates the segment. TCP module 124 then assembles the original BGP message from the contents of the one or more received TCP segments, if necessary, and passes the message to BGP process 126.

BGP process 126 on network element 126 sends BGP messages over TCP connection 117 to BGP process 116 in network element 110 in an analogical manner.

In an example embodiment according to the first approach described herein, and referring to FIG. 1, suppose that the TCP endpoint of TCP connection 117 managed by TCP module 114 of network element 110 is selectively placed in a "passive" mode. BGP process 116 configures TCP module 114 with a new MD5 key for TCP connection 117, and thereafter TCP module 114 begins computing MD5 digests for TCP segments received over TCP connection 117 with both the new and old MD5 keys. The TCP endpoint of TCP connection 117 that is managed by TCP module 124 of network element 120 is placed in the "active" mode. BGP process 126 configures the same new MD5 key at TCP module 124 for TCP connection 117. TCP module 124 then starts using the new MD5 key to sign TCP segments sent over TCP connection 117.

When TCP module 114 receives a TCP segment over TCP connection 117 from TCP module 124, it computes two separate MD5 digests for the TCP segment by using the old and new MD5 keys. First, TCP module 114 uses the old MD5 key to compute a MD5 digest, and when the computed MD5 digest fails to match the MD5 signature in the incoming TCP segment, TCP module 114 re-computes a MD5 digest by using the new MD5 key. Upon determining that the MD5 digest computed with the new MD5 key matches the MD5 signature included in the TCP segment, TCP module 114 switches over to using the new MD5 key for signing TCP segments it sends to TCP module 124 over TCP connection 117 and discards the old MD5 key.

In an example embodiment according to the second approach described herein, and referring to FIG. 1, BGP process 116 configures TCP module 114 to use a second (new) MD5 key, in addition to the currently configured first (old) MD5 key for signing TCP segments sent over TCP connection 117 to TCP module 124. Similarly, BGP process 126 configures TCP module 124 to use the new MD5 key, in addition to the currently configured old MD5 key for signing TCP segments sent over TCP connection 117 to TCP module 114.

BGP process 116 then issues to TCP module 114 a BGP KEEPALIVE message for sending to BGP process 126 on network element 120. TCP module 114 creates a TCP segment for the BGP KEEPALIVE message, and signs the TCP segment by including in the segment a MD5 signature computed with the old MD5 key. TCP module 114 then creates a duplicate TCP segment that includes the same BGP KEEPALIVE message, but which is signed by including a MD5 signature computed with the new MD5 key. TCP module 114 sends both the original and the duplicate TCP segments over TCP connection 117 to TCP module 124.

Upon receipt of the original and duplicate TCP segments, TCP module 124 determines that both segments have the same segment sequence number. TCP module 124 then computes, for each of the original and duplicate TCP segments, a MD5 digest by using its own new and old MD5 keys. When TCP module 124 determines that the original TCP segment includes a MD5 signature that matches the MD5 digest computed with the old MD5 key and that the duplicate TCP segment includes a MD5 signature that matches the MD5 digest computed with the new MD5 key, TCP module 124 concludes that it can switch over to using the new MD5 key to sign TCP segments before sending them over TCP connection 117.

TCP module 114 learns that it can switch over to using the new MD5 key for signing TCP segments in a similar manner. TCP module 114 receives from TCP module 124 an original and a duplicate TCP segment with the same sequence numbers that include a BGP KEEPALIVE message for BGP process 126 from BGP process 116. When TCP module 114 determines that the original TCP segment includes a MD5 signature that matches the MD5 digest computed with the old MD5 key and that the duplicate TCP segment includes a MD5 signature that matches the MD5 digest computed with the new MD5 key, TCP module 114 concludes that it can switch over to using the new MD5 key to sign TCP segments before sending them over TCP connection 117.

Embodiments of the first and second approaches for switching transport protocol keys described herein may be implemented in a variety of operational contexts. For example, the transport protocol messages may be signed with message signatures computed by any type of now known or later developed hash or message digest algorithms, such as, for example, the Secure Hash Algorithm-1 (SHA-1) algorithm.

Moreover, different embodiments may be implemented over a variety of connection-oriented or connectionless transport protocols, such as, for example, User Datagram Protocol (UDP), Stream Control Transmission Protocol (TCP), and Datagram Congestion Control Protocol (DCCP). Furthermore, different embodiments of the approaches described herein may be implemented to provide transport protocol key switchover for a wide variety of upper-layer applications, such as, for example, LDP and Multicast Source Discovery Protocol. For this reason, the embodiments of the two approaches described herein and the operational context depicted in FIG. 1 are to be regarded in an illustrative rather than a restrictive sense.

3.0 First Approach for Switching Transport Protocol Connection Keys 3.1 An Example Embodiment of a Method for Switching MD5 Keys by BGP Sessions Running Over TCP Connections In this example embodiment, two network elements each of which executes a BGP process, such as network elements 110 and 120 depicted in FIG. 1, have established a BGP session over a TCP connection in order to exchange network routing information. In the established state, the TCP connection may be identified by the 5-tuple <SRC IP ADDRESS, SRC TCP PORT, DST IP ADDRESS, DST TCP PORT, MD5 KEY>, where "SRC IP ADDRESS" is the IP address of a BGP peer sending a BGP message, "SRC TCP PORT" is the TCP port number of the sender BGP peer (usually port 179), "DST IP ADDRESS" is the IP address of the BGP peer receiving the BGP message, "DST TCP PORT" is the TCP port number of the receiver BGP peer (usually port 179), and "MD5 KEY" is the current MD5 key configured for TCP connection by both BGP peers, which current MD5 key is used to sign TCP segments that carry in their payload portions the BGP messages sent over the BGP session.

FIG. 2A is a flow diagram that illustrates an overview of a method for switching TCP MD5 keys according to this example embodiment. The TCP endpoint associated with the TCP connection managed by the TCP module of network element 110 is selectively placed in the "passive" mode, and the TCP endpoint associated with the TCP connection at network element 120 is placed in the "active" mode.

The BGP peer executing on network element 110 receives through an Application Programming Interface (API) a second, new MD5 key for the BGP session from a user, usually a network administrator. In step 200, the BGP peer configures the TCP module on network element 110 with the new MD5 key in addition to the first (current or old) MD5 key. Typically, the TCP module managing the "passive" TCP endpoint is configured with the new MD5 key before configuring with the new MD5 the TCP module that manages the "active" TCP endpoint. Since the TCP endpoint at network element 110 is in the "passive" mode, the TCP module managing the endpoint may now accepts TCP segments that include the 5-tuples having either the old or new MD keys:

<SRC IP ADDRESS, SRC TCP PORT, DST IP ADDRESS, DST TCP PORT, MD5 SIGNATURE WITH old MD5 KEY>, and/or <SRC EP ADDRESS, SRC TCP PORT, DST IP ADDRESS, DST TCP PORT, MD5 SIGNATURE WITH new MD5 KEY>.

The BGP peer executing on network element 120 receives through an Application Programming Interface (API) the second, new MD5 key for the BGP session. In step 202, the BGP peer configures the TCP module on network element 120 by replacing the current (old) MD5 key with the new MD5 key. Since the TCP endpoint at network element 120 is in the "active" mode, the TCP module of network element 120 begins signing TCP segments for the TCP connection with the new MD5 key. For each TCP segment, the TCP module computes a MD5 signature by using the new MD5 key, and includes the computed signature in the OPTIONS field of the header of the TCP segment. In some embodiments, at this point the TCP module may discard the old MD5 key, and may re-compute, for each TCP segment still in the re-transmission queue of the TCP connection, a new MD5 signature by using the new MD5 key. In other embodiments, the TCP module may keep, for TCP segments in the current re-transmission window, the MD5 signatures computed with the old MD5 key. In step 204, the TCP module sends over the TCP connection a TCP segment signed with the new MD5 key.

In step 206, the TCP module of network element 110 receives the TCP segment, and based on the 4-tuple <SRC IP ADDRESS, SRC TCP PORT, DST IP ADDRESS, DST TCP PORT> included in the header of the segment determines that the segment belongs to the TCP connection over which the BGP session is established. Since the TCP endpoint for the TCP connection at network element 110 is in the "passive" mode, in step 208 the TCP module computes two MD5 digests for the received TCP segment: a first MD5 digest computed with the old MD5 key, and a second MD5 digest computed with the new MD5 key.

In step 210, the TCP module of network element 110 determines whether the first MD5 digest matches the MD5 signature included in the OPTIONS field of the header of the received TCP segment. If the first MD5 digest matches the MD5 signature in the received TCP segment, in step 212 the TCP module validates the TCP segment and passes the contents of the payload portion of the segment to the BGP peer.

If the first MD5 digest does not match the MD5 signature in the received TCP segment, in step 214 the TCP module of network element 110 determines whether the second MD5 digest matches the MD5 signature in the received TCP segment. If they don't match, in step 216 the TCP module discards the TCP segment since it determines that the TCP segment is not authentic. In this step, the TCP module may also create a log or an audit entry in order to record the receipt of an un-authenticated TCP segment.

Figure 2B:
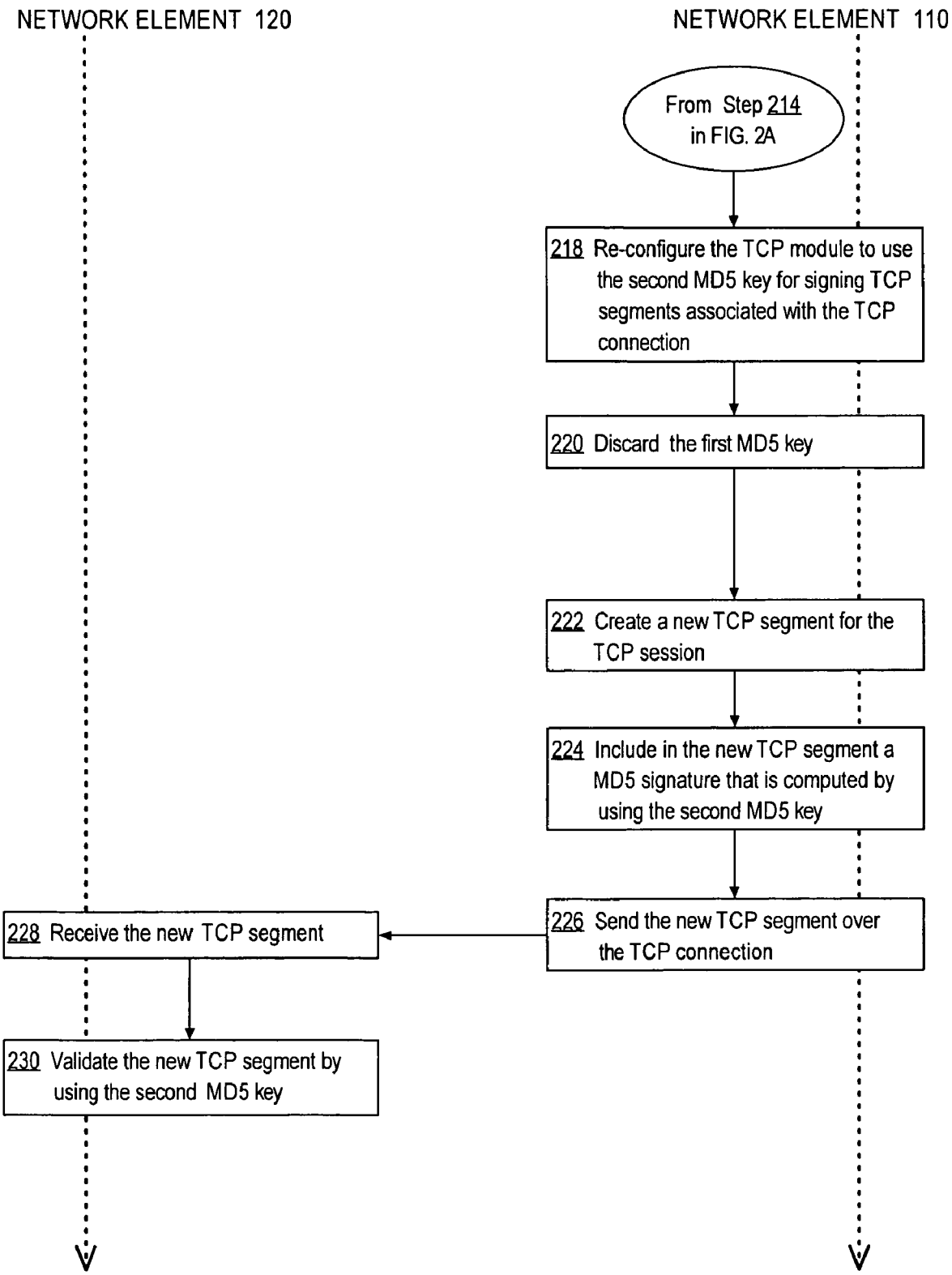
FIG. 2B is a continuation of the flow diagram in FIG. 2A.

If in step 214 the second MD5 digest matches the MD5 signature in the received TCP segment, the TCP module of network element 110 first validates the TCP segment in step 212. The TCP module then proceeds to perform step 218, which is depicted in FIG. 2B.

The receipt of the TCP segment signed with the new MD5 key signals to the TCP module of network element 110 that it may start signing outbound TCP segments by using the new MD5 key. Referring to FIG. 2B, in step 218 the TCP module automatically sets the new MD5 key as the key that is used to sign TCP segments that are sent over the TCP connection. In some embodiments, the old MD5 key is replaced with the new MD5 key for signing TCP segments when a single TCP segment signed with the new MD5 key is received. In other embodiments, the old MD5 key is replaced with the new MD5 key for signing TCP segments when a predetermined and/or pre-configured number of TCP segments signed with the new MD5 key are received. In this way, the TCP module guards against a situation in which a TCP segment signed with the new MD5 key and having a higher sequence number arrives much earlier than other TCP segments with lower sequence numbers that are signed with the old MD5 key.

In step 220, the TCP module may discard the old MD5 key. In some embodiments, the old MD5 key may be kept for a brief period of time, and may be used for computing MD5 digests for inbound TCP packets in order to prevent the discarding of otherwise authentic TCP segments that have been delayed for whatever reason. Further, some embodiments may provide a special BGP API call that may be used by the TCP module to notify the BGP peer utilizing the TCP endpoint in the "passive" mode that the switch to the new MD5 key is completed. Other embodiments may use a trigger in the TCP module for notifying the BGP peer that the switchover to the new MD5 key is complete.

Once the TCP module of network element 110 has switched to using the new MD5 key, in step 222 the TCP module creates a new TCP segment for transmission over the TCP connection, which TCP segment carries a BGP message intended for the BGP peer on network element 120. In step 224, the TCP module computes a MD5 signature for the TCP segment by using the new MD5 key, and in step 226, the TCP module sends the TCP segment over the TCP connection to the TCP module of network element 120.

The TCP module of network element 120 receives the TCP segment in step 228. In step 230, the TCP module validates the TCP segment by comparing and matching the MD5 signature included in the segment to a MD5 digest of the segment computed based on the new MD5 key. At this point, the TCP module passes the content of the payload portion of the TCP segment to the BGP peer on network element 120.

Thus, the example embodiment described above switches MD5 keys for the BGP session in a robust, scalable, and secure manner. This approach to switching to a new MD5 key is transparent to the BGP peers. The approach is also transparent to the BGP KEEPALIVE mechanism and ensures that the BGP session will not be torn down because of an expired BGP HoldTimer. Since the BGP peer that has the TCP endpoint in the "passive" mode may use the new MD5 key for computing MD5 digests of incoming TCP segments for an arbitrary and configurable period of time before the replacing the old MD5 key, the step of configuring the new MD5 key on the "active" TCP endpoint is not bound by any particular interval of time (such as, for example, the HoldTimer interval of the BGP session). Further, the new MD5 key is not transmitted in plain text over the TCP connection and the BGP peers may configure a new MD5 key on the TCP connection at an arbitrary rate or schedule, thus eliminating the possibility of a successful cryptanalytic attack to crack the key.

3.2 Transport Protocol Connection Key Switchover and Application Session Key-Chaining In some embodiments, upper-layer applications that exchange information over application-maintained sessions established over transport connections may select a new transport connection keys from a list of keys. In this way, the applications can automate the transport connection key switchover, and may arrange that the keys on the connection be changed periodically.

For example, in the embodiment of the first approach described above, each BGP peer may be provisioned with the same list of MD5 keys. At predetermined intervals of time, which intervals may be provisioned to the BGP peers with the list of MD5 keys and which may be specified on a per-key basis, the BGP peers may select the next MD5 key in the list as the new MD5 key, and may switch to using the new MD5 key as described above.

In these embodiments, a collision condition may occur in which each upper-layer application may decide that it is selected to operate the transport protocol connection in the "passive" mode. In order to avoid this collision condition, various mechanisms may be employed by the upper-layer applications to determine which of the upper-layer applications that establish an application-maintained session will operate the transport protocol connection in the "passive" mode and which will operate it in the "active" mode. The mechanisms for avoiding a collision condition may be based on one or more criteria associated with, and unique with respect to, the upper-layer applications.

For example, in the embodiment of the first approach described above, the IP address of each BGP peer may be used to determine which BGP peer will operate in "passive" mode and which BGP peer will operate the "active" mode. In one embodiment, the BGP peer with the smaller IP address will be selected to operate in the "passive" mode and the other BGP peer will operate in the "active" mode. In another embodiment, the BGP peer with the larger IP address may be selected to operate the TCP connection in the "passive" mode. In addition to or instead of the IP address of the BGP peers, the selection of which BGP peer will operate in the "passive" and which in the "active" mode may be based on the BGP router IDs of the each BGP peer.

In another example, the selection of which BGP peer will operate in the "passive" mode may be based on the type of the network in which the BGP peer is established. For example, in one embodiment of the first approach described above, one of the BGP peers may be established in an ISP network and the other BGP peer may be established in a customer network of the ISP. In this embodiment, it may be preferable that the BGP peer established in the ISP network is always the BGP peer that operates in the "passive" mode, and that the BGP peer in the customer network always operates in the "active" mode. In this way, the tasks performed by the BGP peer in the customer network may be greatly simplified.

In some embodiments, collision conditions may occur during the establishment of the transport protocol connection or during the establishment of the application-maintained session. In these embodiments, in order to avoid these collision conditions, switching the transport connection key is allowed only for transport connections and application sessions that are in the established state.

For example, in the embodiment of the first approach described above, a TCP module that establishes a TCP connection on behalf of a BGP peer will not try to change the MD5 key during the initial 3-way handshake (SYN-ACK-ACK TCP segment exchange) that sets up the TCP connection. Similarly, changes to the MD5 key may not be allowed during the establishment of the BGP session between the BGP peers, or during a BGP "Route Refresh" exchange.

3.3 Alternative Embodiments and Operational Contexts

In some embodiments, the transport protocol module at a host may use the same key to sign messages that are sent over any and all connections. In other embodiments, each transport connection that supports an upper-application session may have its own key.

For example, in the embodiment of the first approach described above, the TCP module of network element 110 may use the same MD5 key for each and every TCP connection managed by the TCP module. In these embodiments, in order to minimize the risk of cryptanalytic attack against the MD5 key, the TCP module may be configured to sign (by using the MD5 key) TCP segments only for TCP connections that support a BGP session, e.g. to sign only TCP segments that include application messages received from the BGP TCP port 179. In other embodiments, the TCP module may be configured with a separate key for each BGP session established over a TCP connection managed by the TCP module.

Embodiments of the first approach for switching transport protocol keys may be deployed in a variety of operational contexts. For example, in the embodiment of the first approach described above, the "passive" BGP peer may be executing on a network element established in a ISP network and the "active" BGP peer may be executing on a network element established in a customer network of the ISP network. In another embodiment, the "passive" BGP peer may be executing on a network element established the customer network and the "active" BGP peer may be executing on a network element established in the ISP network. In a different embodiment, both the "passive" and "active" BGP peers may be executing on network elements established in the same network. Thus, the embodiments of the first approach described herein are not limited to any particular operational context.

Figure 3A:
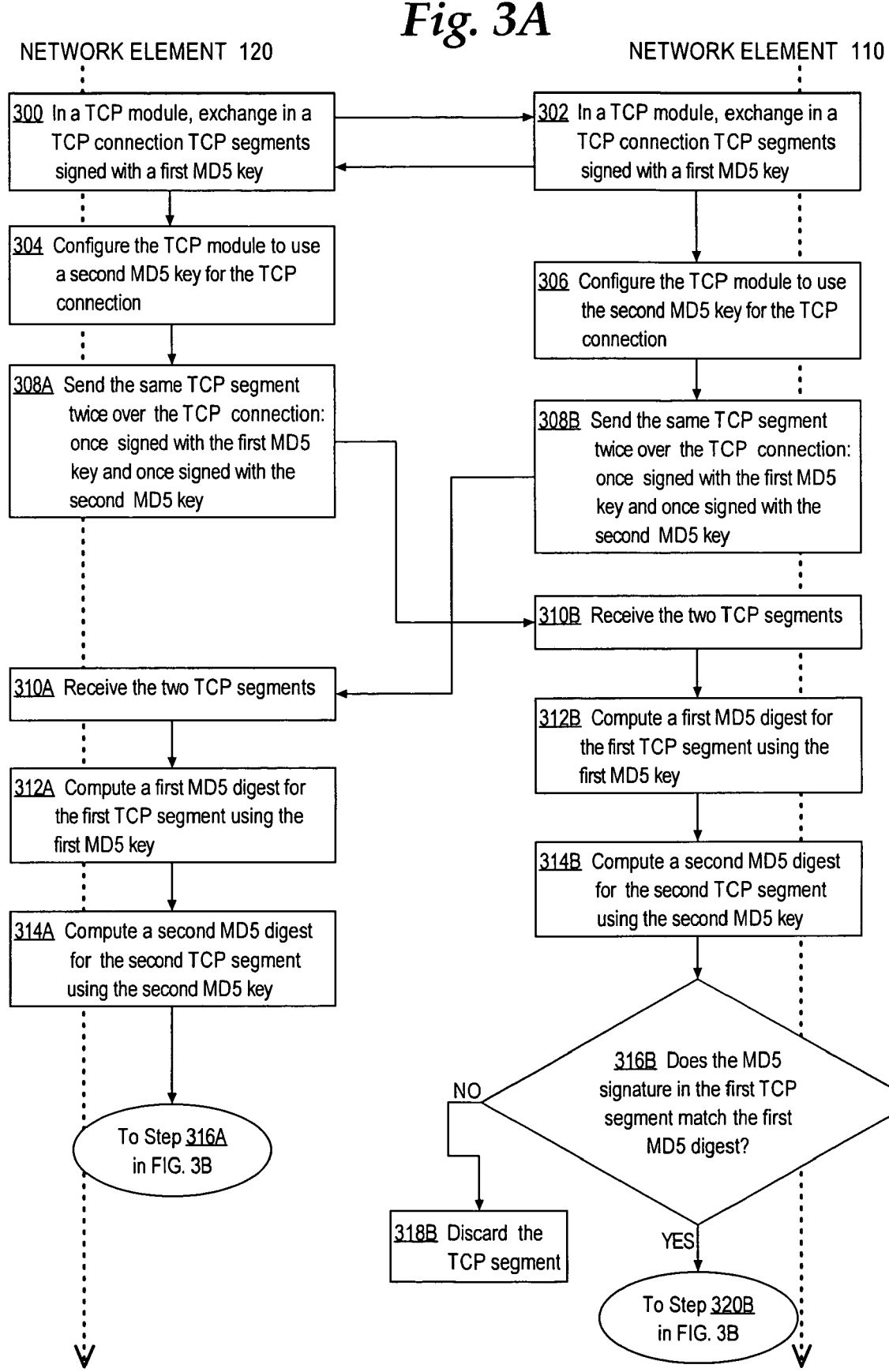
FIG. 3A is a flow diagram that illustrates an overview of a method for switching TCP MD5 keys according to an example embodiment of a second approach.

4.0 Second Approach For Switching Transport Protocol Connection Keys 4.1 An Example Embodiment of a Method for Switching MD5 Keys by BGP Sessions Running Over TCP Connections FIG. 3A is a flow diagram that illustrates an overview of a method for switching TCP MD5 keys according to an example embodiment of the second approach.

In this example embodiment, two network elements each of which executes a BGP process, such as network elements 110 and 120 depicted in FIG. 1, have established a BGP session over a TCP connection in order to exchange network routing information. A current (old) MD5 key is configured for the TCP connection, and each TCP segment sent over the connection by either network element is signed with this current MD5 key. Thus, in step 300, the TCP module of network element 120 sends TCP segments carrying BGP messages over the TCP connection to network element 110, and receives TCP segments carrying BGP messages over the TCP connection from network element 110. Similarly, in step 302 the TCP module of network element 110 sends TCP segments carrying BGP messages over the TCP connection to network element 120, and receives TCP segments carrying BGP messages over the TCP connection from network element 120.

The BGP peer executing on network element 120 receives through a BGP Application Programming Interface (API) a second, new MD5 key for the BGP session. The new MD5 key may be in the form of a password set by a user through a Command Line Interface (CLI), or it may be a key read from a list of MD5 keys by a process executing an automated script. In step 304, the BGP peer configures the TCP module on network element 120 to use the new MD5 key, in addition to the current (old) MD5 key, to sign TCP segments sent over the TCP connection. In this step, the BGP peer issues a BGP KEEPALIVE message to the TCP module for transmission over the TCP connection regardless of whether another BGP message has recently been sent to the BGP peer on network element 110. The TCP module then creates two TCP segments that include the same BGP KEEPALIVE message, where the two TCP segments have the same sequence number and the same acknowledgement number. The TCP module then computes a first MD5 signature for the first TCP segment by using the current (old) MD5 key, and includes the first MD5 signature in the OPTIONS field of the header of the first TCP segment. The TCP module also computes a second MD5 signature for the second TCP segment by using the new MD5 key, and includes the second MD5 signature in the OPTIONS field of the header of the second TCP segment. In step 308A, the TCP module sends the first and second TCP segments over the TCP connection to the TCP module of network element 110.

Similarly to the BGP peer executing on network element 120, the BGP peer executing on network element 110 receives through a BGP API a second, new MD5 key for the BGP session. The BGP peer on network element 110 may receive the new MD5 key before, at the same time as, or after the BGP peer on network element 120 is configured with the new MD5 key. The timing of receiving the new MD5 key at the BGP peers is not important, and for the this reason the depiction in FIG. 3A showing that the BGP peer on network element 120 receives the new MD5 key first is only an illustrative example. In step 306, the BGP peer configures the TCP module on network element 110 to use the new MD5 key, in addition to the current (old) MD5 key, to sign TCP segments sent over the TCP connection. In this step, the BGP peer issues a BGP KEEPALIVE message to the TCP module for transmission over the TCP connection regardless of whether another BGP message has recently been sent to the BGP peer on network element 120. The TCP module then creates two TCP segments that include the same BGP KEEPALIVE message, where the two TCP segments have the same sequence number and the same acknowledgement number. The TCP module then computes a first MD5 signature for the first TCP segment by using the current (old) MD5 key, and includes the first MD5 signature in the OPTIONS field of the header of the first TCP segment. The TCP module also computes a second MD5 signature for the second TCP segment by using the new MD5 key, and includes the second MD5 signature in the OPTIONS field of the header of the second TCP segment. In step 308B, the TCP module sends the first and second TCP segments over the TCP connection to the TCP module of network element 120.

In step 310B, the TCP module of network element 110 receives the first and the second TCP segment sent from the TCP module of network 120 in step 308A. The TCP module of network element 110 then performs steps 312B to 326B.

In step 312B, the TCP module computes a first MD5 digest for the first TCP segment by using the current (old) MD5 key. In step 314B, the TCP module computes a second MD5 digest for the second TCP segment by using the new MD5 key. The TCP module then compares the MD5 signature in the first TCP segment with the first computed MD5 digest for the segment. If in step 316B the MD5 signature in the first TCP segment does not match the first computed MD5 digest, in step 318B the TCP module may discard the first TCP segment, or alternatively, may also try to compute an MD5 digest for the segment by using the new MD5 key.

Figure 3B:
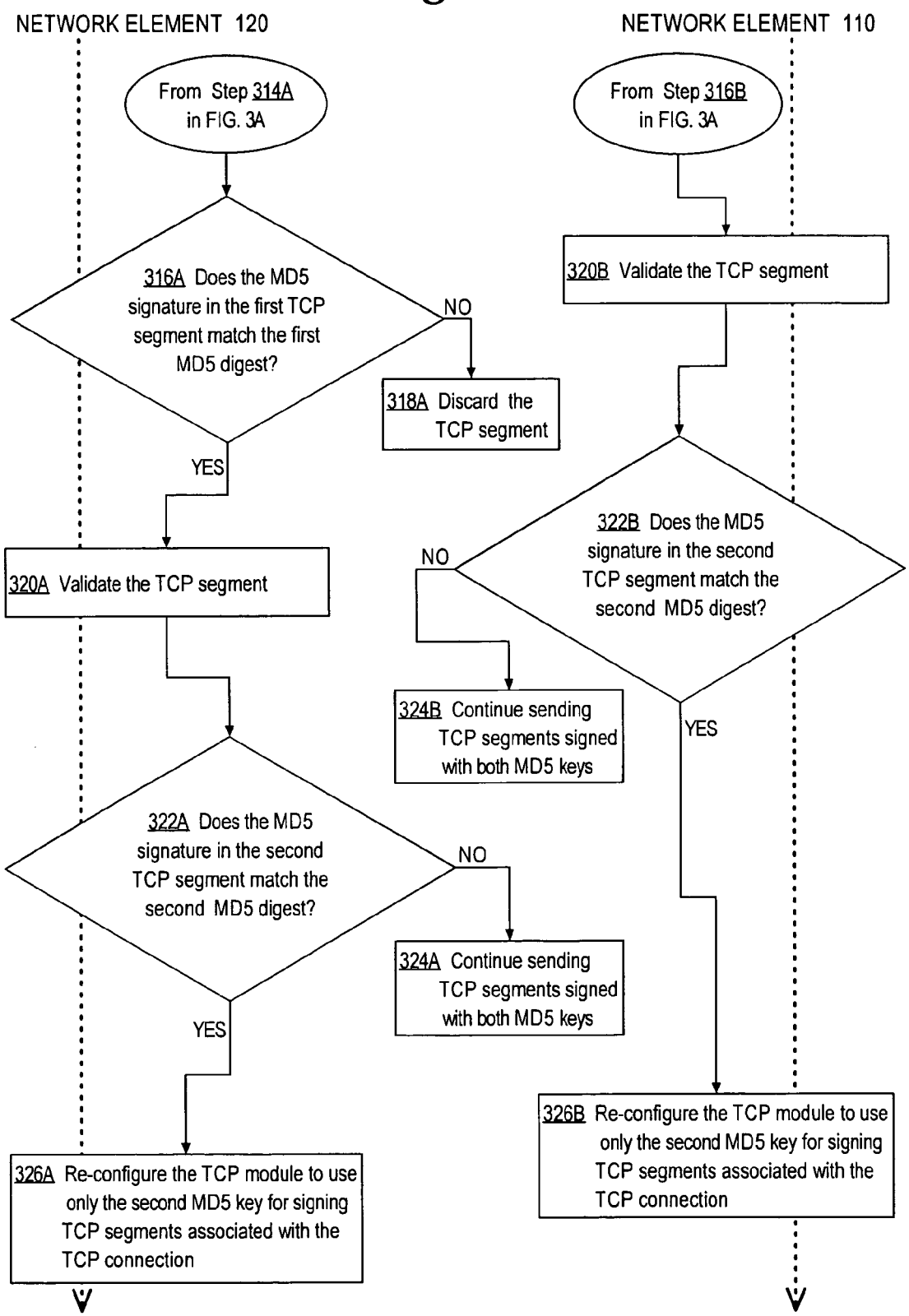
FIG. 3B is a continuation of the flow diagram in FIG. 3A.

If in step 316B the MD5 signature in the first TCP segment matches the first computed MD5 digest, then the TCP module proceeds with step 320B in FIG. 3B. Referring now to FIG. 3B, in step 320B the TCP module validates the TCP segment and passes it to the BGP peer. The TCP module then compares the MD5 signature in the second TCP segment with the second computed MD5 digest for the segment. If in step 322B the MD5 signature in the second TCP segment does not match the second computed MD5 digest, the TCP module determines that it has not received two TCP segments with the same sequence number and the same acknowledgement number, where one of the segments is signed with the old MD5 key and the other is signed with the new MD5 key. Thus, in step 324B the TCP module concludes that it needs to continue sending "duplicate" copies of a TCP segment by signing one of the copies with the old MD5 key and the other copy with the new MD5 key.

If in step 322B the MD5 signature in the second TCP segment matches the second computed MD5 digest, the TCP module determines that it has two "duplicate" TCP segments with the same sequence number and the same acknowledgement number, where one of the segments is signed with the old MD5 key and the other is signed with the new MD5 key. The TCP module concludes that a switchover to the new MD5 key must be performed, and in step 326B the TCP module is automatically re-configured to use only the new MD5 key for signing TCP segments that carry BGP messages to the BGP peer on network element 120. In some embodiments, at this point the TCP module may also notify the BGP peer on its own network element 110 that the switchover to the new MD5 key is completed.

After being configured with the new MD5 key, the TCP module of network element 120 performs the same steps as the TCP module on network element 120. Specifically, in step 310A of FIG. 3A, the TCP module of network element 120 receives the first and the second TCP segment sent from the TCP module of network 110 in step 308B. The TCP module of network element 120 then performs steps 312A to 326A.

In step 312A, the TCP module computes a first MD5 digest for the first TCP segment by using the current (old) MD5 key. In step 314A, the TCP module computes a second MD5 digest for the second TCP segment by using the new MD5 key. The TCP module then compares the MD5 signature in the first TCP segment with the first computed MD5 digest for the segment. Referring now to FIG. 3B, if in step 316A the MD5 signature in the first TCP segment does not match the first computed MD5 digest, in step 318A the TCP module may silently discard the first TCP segment.

If in step 316A the MD5 signature in the first TCP segment matches the first computed MD5 digest, in step 320A the TCP module validates the TCP segment and passes it to the BGP peer. The TCP module then compares the MD5 signature in the second TCP segment with the second computed MD5 digest for the segment. If in step 322A the MD5 signature in the second TCP segment does not match the second computed MD5 digest, the TCP module determines that it has not received two TCP segments with the same sequence number and the same acknowledgement number, where one of the segments is signed with the old MD5 key and the other is signed with the new MD5 key. Thus, in step 324A the TCP module concludes that it needs to continue sending "duplicate" copies of a TCP segment by signing one of the copies with the old MD5 key and the other copy with the new MD5 key.

If in step 322A the MD5 signature in the second TCP segment matches the second computed MD5 digest, the TCP module determines that it has two "duplicate" TCP segments with the same sequence number and the same acknowledgement number, where one of the segments is signed with the old MD5 key and the other is signed with the new MD5 key. The TCP module concludes that a switchover to the new MD5 key must be performed, and in step 326A the TCP module is automatically re-configured to use only the new MD5 key for signing TCP segments that carry BGP messages to the BGP peer on network element 110. In some embodiments, at this point the TCP module may also notify the BGP peer on its own network element 120 that the switchover to the new MD5 key is completed.

Thus, the example embodiment described above switches MD5 keys for the BGP session without relying on the order in which the new MD5 key is configured on the BGP peers that established the session. Moreover, similar to the first approach described herein, this second approach to switching to a new MD5 key is also transparent to the BGP KEEPALIVE mechanism employed by the BGP peers. The second approach also ensures that the BGP session will not be torn down because of an expired BGP HoldTimer. Since each BGP peer may use both the old and new MD5 keys to process inbound and outbound TCP segments for an arbitrary and configurable period of time before discarding the old MD5 key, the step of configuring the new MD5 key on the BGP peers is not bound by any particular interval of time (such as, for example, the HoldTimer interval of the BGP session). Further, the use of BGP KEEPALIVE messages, which are only 19 bytes long, to signal the switchover to the new MD5 key utilizes effectively the processing resources expended by the network elements to facilitate the key switchover.

4.2 Alternative Embodiments

In some embodiments of the second approach implemented over TCP, after a TCP module is automatically re-configured to use only the new MD5 key for signing TCP segments for a TCP connection, the TCP module traverses the retransmission queue for the TCP connection and re-computes the MD5 signatures by using the new MD5 key for all TCP segments in the queue that have been previously signed with the old MD5 key. In this way, TCP segments that are retransmitted will carry a MD5 signature computed with the new MD5 key and will not be dropped at the receiving end of the TCP connection if the receiving TCP module has already discarded the old MD5 key.

In other embodiments of the second approach implemented over TCP, after a TCP module is reconfigured to use the new MD5 key for signing outbound TCP segments over a TCP connection, a BGP peer utilizing the module may be able to revert to using the first MD5 key. This may happen because of a variety of reasons, such as, for example, loss of network packets due to congestion. In these embodiments, a mechanism may be provided that specify a window of time in which a sender TCP module will continue to send "duplicate" TCP segments signed with both the old MD5 key and the new MD5 key even after receiving a "duplicate" TCP segment that is signed with both MD5 keys. The sender TCP module will be automatically re-configured to using only the new MD5 key for signing outbound TCP segments only after the window of time has expired and the module has received one or more TCP segments signed with both MD5 keys during that window. In this way, the TCP module is able to detect an unexpected reversal to the old MD5 key at the other end of the TCP connection during the specified window of time. In these embodiments, the window of time may be a parameter that is configurable on a per-TCP module or per-TCP connection basis depending on the particular upper-layer application.

In some embodiments of the second approach, any upper-layer application message may be used to create "duplicate" transport protocol messages that signal to a receiving transport protocol endpoint that a switchover to a new transport connection key is desired. In other embodiments, only specific upper-layer application messages may be used for this purpose.

For example, in some embodiments that support BGP sessions over TCP connections, all BGP messages sent to a BGP peer over a TCP connection are sent in "duplicate" TCP segments signed with both the old and new MD5 keys until a switchover to the new MD5 key is completed. In other embodiments, a BGP KEEPALIVE message is the only BGP message that is sent in "duplicate" TCP segments signed with both the old and new MD5 keys. BGP messages of any other type, such as, for example, BGP UPDATE messages, are sent in TCP segments signed only with the old MD5 key until the switchover to the new MD5 key is completed. When the switchover is completed, these BGP messages are sent in TCP segments signed with the new MD5 key. In addition, new MD5 signatures may be computed by using the new MD5 key for all TCP segments in the retransmission queue that carry any of these BGP messages and that are signed with the old MD5 key.

Some TCP implementations provide the "Nagle" optimization mechanism by which a TCP module may include two or more upper-layer application messages in a single TCP segment. The Nagle optimization algorithm is described in IETF's *RFC*896. Embodiments of the second approach implemented over TCP modules that use the Nagle optimization mechanism, may have to disable the Nagle optimization mechanism in order to ensure that "duplicate" upper-layer application messages are sent in their own separate TCP segments signed respectively with the old and new MD5 keys. In this way, the receiving TCP module gets a clear signal that a switchover to the new MD5 key is intended.

Some embodiments of the second approach implemented over TCP may also make use of the TCP "PSH" (push) flag in order to achieve a faster key switchover. When the TCP "PSH" flag is set in the header of a TCP segment, a sender TCP module is forced to transmit the TCP segment right-away without delay. On the receiving end, when a TCP module receives a TCP segment with the "PSH" flag set it immediately processes the TCP segment and passes the data to the receiving upper-layer application.

In an embodiment of the second approach described above with respect to a BGP session over a TCP connection, a BGP peer that wants to change the MD5 key for the TCP connection issues a BGP KEEPALIVE message to its TCP module and indicates that the TCP module needs to transmit the message right away. The TCP module creates the "duplicate" TCP segments for the BGP KEEPALIVE message that are signed with both the old and the new MD5 keys, and sets the "PSH" flag in the header of the segments. In this way, any network element between the sender and the receiver TCP module that only re-transmits traffic is forced to transmit these two "duplicate" TCP segments without delay, which speeds up the process of switching to the new MD5 key at the receiving TCP module.

Similarly to the embodiments of the first approach for switching transport protocol keys described above, embodiments of the second approach for switching transport protocol keys also may be deployed in a variety of operational contexts and over a variety of transport protocols, and may support a variety of upper-layer applications. For this reason, the embodiments of the second approach for switching transport protocol keys described herein are to be regarded in an illustrative rather than a restrictive sense.

4.3 Application Session Key-Chaining

Embodiments of the second approach for switching transport protocol keys described herein may also make use of the automated upper-layer application key-chaining mechanisms described above with respect to the first approach. For example, in some embodiments, upper-layer applications that have application-maintained sessions established over transport connections may select a new transport connection keys from a list of keys. In this way, the applications can automate the transport connection key switchover, and may arrange that the keys on the connection be changed periodically.

For example, in the embodiment of the second approach regarding BGP sessions over TCP connections described above, both BGP peers may be configured with the same MD5 key list. The order of MD5 keys in the list is the same for both BGP peers. Further, each BGP peer may be provisioned with the same key-change interval. In operation, at approximately the same time (the time clocks on the network elements executing the BGP peers need not be synchronized), according to the second approach described above each BGP peer would select the next MD5 key from the list and configure it as the new MD5 key on its respective TCP module. By following the steps of the second approach outlined above, the TCP modules supporting each BGP peer would automatically facilitate the switchover to the new MD5 key and notify the BGP peers. The BGP peers will make a note of the switchover. Then, when each BGP peer determines that the provisioned key-change interval has expired, it will select the next MD5 key from the list and repeat the above procedure. When the BGP peers reach the end of the key list, they may start again from the beginning, or may alert a network administrator to provide a new list. Since the order in which the BGP peers change their respective MD5 key is not relevant in the second approach, the second approach allows for the complete automation of MD5 key switchover for a BGP session running over a TCP connection. Further, the list of keys used in the key-chaining mechanisms described herein may be provisioned to the upper-layer applications by using any secure channel, such as, for example, by sending the list to the network administrators of the applications over the telephone.

5.0 Implementation Mechanisms—Hardware Overview

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for switching transport protocol connection keys. According to one embodiment of the invention, approaches for switching transport protocol connection keys are provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for switching transport protocol connection keys as described herein.

The received code may be executed by processor 404 as it is received, and/or stored in storage device 410, or other non-volatile storage for later execution. In this manner, computer system 400 may obtain application code in the form of a carrier wave.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of switching transport protocol connection keys, the method comprising the computer-implemented steps of:

in a transport protocol module configured to use a first key for signing messages associated with a transport protocol connection, configuring a second key for the transport protocol connection;

receiving a first message associated with the transport protocol connection, wherein the first message includes a first signature;

computing a first message digest and a second message digest for the first message, wherein the first message digest is based on the first key and the second message digest is based on the second key; and validating the first message if the first signature matches any one of the first message digest and the second message digest;

when the first signature included in the first message matches the second message digest, re-configuring the transport protocol module to use the second key for signing messages associated with the transport protocol connection;

sending a second message over the transport protocol connection, wherein the second message includes a second signature that is computed based on the second key.

2. A method as recited in claim 1, wherein the transport protocol module is executed by a network element that is established in a packet-switched network.

3. A method as recited in claim 1, wherein:

the transport protocol module is a Transmission Control Protocol (TCP) module;

the transport protocol connection is a TCP connection;

the first key is a first Message-Digest5 (MD5) key;

the second key is a second MD5 key;

the first message is a first TCP segment;

the first signature is a first MD5 signature included in a MD5 OPTION in the header of the first TCP segment;
the first message digest is a first MD5 digest; and
the second message digest is a second MD5 digest.

4. A method as recited in claim 3, wherein a Border Gateway Protocol (BGP) process has established a BGP session with a BGP peer over the TCP connection.

5. A method as recited in claim 4, further comprising:
when the first MD5 signature included in the first TCP segment matches the second MD5 digest, re-configuring the TCP module to use the second MD5 key for signing TCP segments associated with the TCP connection; and
notifying the BGP process that the second MD5 key is used for signing TCP segments.

6. A method as recited in claim 5, wherein:
the BGP process performs the step of configuring the TCP module with the second MD5 key for the TCP connection; and
the BGP peer configures a TCP peer module of a network element that executes the BGP peer to use the second MD5 key for signing TCP segments that are sent to the BGP process over the TCP connection.

7. A method as recited in claim 6, wherein:
the BGP process selects the second MD5 key from a list of MD5 keys; and
the BGP peer also selects the second MD5 key from the list of MD5 keys, wherein the list of MD5 keys has been provisioned to both the BGP process and the BGP peer.

8. A method as recited in claim 7, wherein, based on one or more criteria associated with the BGP process and the BGP peer, the BGP process performs the step of configuring the TCP module with the second MD5 key for the TCP connection before the BGP peer configures the TCP peer module to use the second MD5 key for signing TCP segments that are sent to the BGP process over the TCP connection.

9. A method as recited in claim 4, wherein:
the BGP process is executing on a network element established in an Internet Service Provider (ISP) network; and
the BGP peer is executing on a network element established in a customer network of the ISP network.

10. A method as recited in claim 4, wherein:
the BGP peer is executing on a network element established in an Internet Service Provider (ISP) network; and
the BGP process is executing on a network element established in a customer network of the ISP network.

11. A method of switching Message-Digest5 (MD5) keys used in Transmission Control Protocol (TCP) connections, the method comprising the computer-implemented steps of:
in a TCP module configured to use a first MD5 key for signing TCP segments associated with a TCP connection, configuring a second MD5 key for signing TCP segments associated with the TCP connection;
receiving a first TCP segment associated with the TCP connection, wherein:
the first TCP segment includes a first message that is sent to an application that utilizes the TCP connection; and
the first TCP segment includes a first MD5 signature;
receiving a second TCP segment associated with the TCP connection, wherein:
the second TCP segment includes the first message that is sent to the application;
the second TCP segment includes a second MD5 signature; and
the second TCP segment has the same sequence number as the first TCP segment;
computing a first MD5 digest for the first TCP segment based on the first MD5 key;
computing a second MD5 digest for the second TCP segment based on the second MD5 key; and
if the first MD5 digest matches the first MD5 signature included in the first TCP segment and the second MD5 digest matches the second MD5 signature included in the second TCP segment, then re-configuring the TCP connection to use only the second MD5 key for signing TCP segments associated with the TCP connection.

12. A method as recited in claim 11, wherein re-configuring the TCP connection to use only the second MD5 key for signing TCP segments associated with the TCP connection further comprises ceasing to send over the TCP connection any TCP segments that are signed using the first MD5 key.

13. A method as recited in claim 11, further comprising:
before re-configuring the TCP connection to use only the second MD5 key for signing TCP segments associated with the TCP connection, performing the steps of:
sending a third TCP segment associated with the TCP connection, wherein the third TCP segment includes a second message received from the application and a third MD5 signature that is computed based on the first MD5 key; and
sending a fourth TCP segment associated with the TCP connection, wherein the fourth TCP segment includes the second message received from the application and a fourth MD5 signature that is computed based on the second MD5 key, and wherein the fourth TCP segment has the same sequence number as the third TCP segment; and
after re-configuring the TCP connection to use only the second MD5 key for signing TCP segments associated with the TCP connection, sending a fifth TCP segment associated with the TCP connection, wherein the fifth TCP segment includes a fifth MD5 signature that is computed based on the second MD5 key.

14. A method as recited in claim 13, further comprising keeping track of the third TCP segment and the fourth TCP segment in a retransmission queue associated with the TCP connection.

15. A method as recited in claim 11, wherein:
the application is a Border Gateway Protocol (BGP) process; and
the first message is a BGP KEEPALIVE message sent to the BGP process from a BGP peer over a BGP session that is established between the BGP process and the BGP peer over the TCP connection.

16. A method as recited in claim 15, wherein:
the BGP process performs the step of configuring the TCP module with the second MD5 key for the TCP connection; and
the BGP peer configures a TCP peer module of a network element that executes the BGP peer to use the second MD5 key for signing TCP segments that are sent to the BGP process over the TCP connection.

17. A method as recited in claim 16, wherein:
the BGP process selects the second MD5 key from a list of MD5 keys;
the BGP peer also selects the second MD5 key from the list of MD5 keys, wherein the list of MD5 keys has been provisioned to both the BGP process and the BGP peer; and
both the BGP process and the BGP peer select the second MD5 key from the list of MD5 keys after a predetermined interval of time has expired, wherein the predetermined interval of time has been provisioned to both the BGP process and the BGP peer.

18. A method as recited in claim 17, wherein the list of MD5 keys is an ordered list of a plurality of MD5 keys, wherein the plurality of MD5 keys comprise the first MD5 key and the second MD5 key.

19. A method as recited in claim 11, wherein the application is a Label Distribution Protocol (LDP) process.

20. An apparatus for switching transport protocol connection keys, comprising:
one or more processors;
one or more stored sequences of instructions which, when executed by the one or more processors, cause the one or more processors to perform the steps of:
in a transport protocol module configured to use a first key for signing messages associated with a transport protocol connection, configuring a second key for the transport protocol connection;
receiving a first message associated with the transport protocol connection, wherein the first message includes a first signature;
computing a first message digest and a second message digest for the first message, wherein the first message digest is based on the first key and the second message digest is based on the second key; and
validating the first message if the first signature matches any one of the first message digest and the second message digests
when the first signature included in the first message matches the second message digest, re-configuring the transport protocol module to use the second key for signing messages associated with the transport protocol connection;
sending a second message over the transport protocol connection, wherein the second message includes a second signature that is computed based on the second key

21. The apparatus of claim 20, wherein the apparatus is a network element that is established in a packet-switched network.

22. The apparatus of claim 20, wherein:
the transport protocol module is a Transmission Control Protocol (TCP) module; the transport protocol connection is a TCP connection;
the first key is a first Message-Digest5 (MD5) key; the second key is a second MD5 key;
the first message is a first TCP segment;
the first signature is a first MD5 signature included in a MD5 OPTION in the header of the first TCP segment;
the first message digest is a first MD5 digest; and the second message digest is a second MD5 digest.

23. The apparatus of claim 22, wherein a BGP process has established a BGP session with a BGP peer over the TCP connection.

24. The apparatus of claim 23, wherein the one or more stored sequences of instructions further cause the one or more processors to perform the steps of:
when the first MD5 signature included in the first TCP segment matches the second MD5 digest, re-configuring the TCP module to use the second MD5 key for signing TCP segments associated with the TCP connection; and
notifying the BGP process that the second MD5 key is used for signing TCP segments.

25. The apparatus of claim 24, wherein the BGP process performs the step of configuring the TCP module with the second MD5 key for the TCP connection, wherein the step of configuring further comprises selecting the second MD5 key from a list of MD5 keys that has been provisioned to both the BGP process and the BGP peer.

26. The apparatus of claim 25, wherein, based on one or more criteria associated with the BGP process and the BGP peer, the BGP process performs the step of configuring the TCP module with the second MD5 key for the TCP connection before the BGP peer begins using the second MD5 key to sign TCP segments that are sent to the BGP process over the TCP connection.

27. An apparatus for switching Message-Digest5 (MD5) keys used in Transmission Control Protocol (TCP) connections, comprising:
one or more processors;
one or more stored sequences of instructions which, when executed by the one or more processors, cause the one or more processors to perform the steps of;
in a TCP module configured to use a first MD5 key for signing TCP segments associated with a TCP connection, configuring a second MD5 key for signing TCP segments associated with the TCP connection;
receiving a first TCP segment associated with the TCP connection, wherein:
the first TCP segment includes a first message that is sent to an application that utilizes the TCP connection; and
the first TCP segment includes a first MD5 signature;
receiving a second TCP segment associated with the TCP connection, wherein:
the second TCP segment includes the first message that is sent to the application;
the second TCP segment includes a second MD5 signature; and the second TCP segment has the same sequence number as the first TCP segment;
computing a first MD5 digest for the first TCP segment based on the first MD5 key;
computing a second MD5 digest for the second TCP segment based on the second MD5 key; and
if the first MD5 digest matches the first MD5 signature included in the first TCP segment and the second MD5 digest matches the second MD5 signature included in the second TCP segment, then re-configuring the TCP connection to use only the second MD5 key for signing TCP segments associated with the TCP connection.

28. The apparatus of claim 27, wherein the step of re-configuring the TCP connection to use only the second MD5 key for signing TCP segments associated with the TCP connection further comprises ceasing to send over the TCP connection any TCP segments that are signed using the first MD5 key.

29. The apparatus of claim 27, wherein the one or more stored sequences of instructions further cause the one or more processors to perform the steps of:
before re-configuring the TCP connection to use only the second MD5 key for signing TCP segments associated with the TCP connection, performing the steps of:
sending a third TCP segment associated with the TCP connection, wherein the third TCP segment includes a second message received from the application and a third MD5 signature that is computed based on the first MD5 key; and
sending a fourth TCP segment associated with the TCP connection, wherein the fourth TCP segment includes the second message received from the application and a fourth MD5 signature that is computed based on the second MD5 key, and wherein the fourth TCP segment has the same sequence number as the third TCP segment; and
after re-configuring the TCP connection to use only the second MD5 key for signing TCP segments associated with the TCP connection, sending a fifth TCP segment associated with the TCP connection, wherein the fifth TCP segment includes a fifth MD5 signature that is computed based on the second MD5 key.

30. The apparatus of claim 29, wherein the one or more stored sequences of instructions further cause the one or more processors to perform the step of keeping track of the third TCP segment and the fourth TCP segment in a retransmission queue associated with the TCP connection.

31. The apparatus of claim 27, wherein:
the application is a BGP process; and
the first message is a BGP KEEPALIVE message sent to the BGP process from a BGP peer over a BGP session that is established between the BGP process and the BGP peer over the TCP connection.

32. The apparatus of claim 31, wherein the BGP process performs the step of configuring the TCP module with the second MD5 key for the TCP connection, wherein the step of configuring further comprises selecting the second MD5 key from a list of MD5 keys that has been provisioned to both the BGP process and the BGP peer.

33. The apparatus of claim 32, wherein the list of MD5 keys is an ordered list of a plurality of MD5 keys, wherein the plurality of MD5 keys comprise the first MD5 key and the second MD5 key.

34. The apparatus of claim 32, wherein BGP process performs the step of configuring the TCP module with the second MD5 key for the TCP connection after the expiration of a predetermined interval of time, wherein the predetermined interval of time has been provisioned to both the BGP process and the BGP peer.

35. The apparatus of claim 27, wherein the application is a Label Distribution Protocol (LDP) process.

36. An apparatus for switching transport protocol connection keys, comprising:
means for configuring a second key for the transport protocol connection in a transport protocol module configured to use a first key for signing messages associated with a transport protocol connection;
means for receiving a first message associated with the transport protocol connection, wherein the first message includes a first signature;
means for computing a first message digest and a second message digest for the first message, wherein the first message digest is based on the first key and the second message digest is based on the second key; and
means for validating the first message if the first signature matches any one of the first message digest and the second message digest;
means for re-configuring the transport protocol module to use the second key for signing messages associated with the transport protocol connection when the first signature included in the first message matches the second message digest;
means for sending a second message over the transport protocol connection, wherein the second message includes a second signature that is computed based on the second key.

37. A volatile or non-volatile computer-readable storage medium carrying one or more sequences of instructions for switching transport protocol connection keys, wherein the execution of one or more sequences of instructions by one or more processors causes the one or more processors to perform:
configuring a second key for the transport protocol connection in a transport protocol module configured to use a first key for signing messages associated with a transport protocol connection;
receiving a first message associated with the transport protocol connection, wherein the first message includes a first signature;
computing a first message digest and a second message digest for the first message, wherein the first message digest is based on the first key and the second message digest is based on the second key; and
validating the first message if the first signature matches any one of the first message digest and the second message digest;
when the first signature included in the first message matches the second message digest, re-configuring the transport protocol module to use the second key for signing messages associated with the transport protocol connection;
sending a second message over the transport protocol connection, wherein the second message includes a second signature that is computed based on the second key.

38. A medium as recited in claim 37, wherein the transport protocol module is executed by a network element that is established in a packet-switched network.

39. A medium as recited in claim 37, wherein:
the transport protocol module is a Transmission Control Protocol (TCP) module;
the transport protocol connection is a TCP connection;
the first key is a first Message-Digest5 (MD5) key;
the second key is a second MD5 key;
the first message is a first TCP segment;
the first signature is a first MD5 signature included in a MD5 OPTION in the header of the first TCP segment;
the first message digest is a first MD5 digest; and
the second message digest is a second MD5 digest.

40. A medium as recited in claim 39, wherein a Border Gateway Protocol (BGP) process has established a BGP session with a BGP peer over the TCP connection.

41. A medium as recited in claim 40, further comprising:
when the first MD5 signature included in the first TCP segment matches the second MD5 digest, re-configuring the TCP module to use the second MD5 key for signing TCP segments associated with the TCP connection; and
notifying the BGP process that the second MD5 key is used for signing TCP segments.

42. A medium as recited in claim 41, wherein:
the BGP process performs the step of configuring the TCP module with the second MD5 key for the TCP connection; and
the BGP peer configures a TCP peer module of a network element that executes the BGP peer to use the second MD5 key for signing TCP segments that are sent to the BGP process over the TCP connection.

43. A medium as recited in claim 42, wherein:
the BGP process selects the second MD5 key from a list of MD5 keys; and
the BGP peer also selects the second MD5 key from the list of MD5 keys, wherein the list of MD5 keys has been provisioned to both the BGP process and the BGP peer.

44. A medium as recited in claim 43, wherein, based on one or more criteria associated with the BGP process and the BGP peer, the BGP process performs the step of configuring the TCP module with the second MD5 key for the TCP connection before the BGP peer configures the TCP peer module to use the second MD5 key for signing TCP segments that are sent to the BGP process over the TCP connection.

45. A medium as recited in claim 40, wherein:
the BGP process is executing on a network element established in an Internet Service Provider (ISP) network; and the BGP peer is executing on a network element established in a customer network of the ISP network.

46. A medium as recited in claim 40, wherein:
the BGP peer is executing on a network element established in an Internet Service Provider (ISP) network; and
the BGP process is executing on a network element established in a customer network of the ISP network.

* * * * *